(12) United States Patent
Blaakmeer et al.

(10) Patent No.: US 7,104,006 B1
(45) Date of Patent: Sep. 12, 2006

(54) MINERAL WOOL PLANT SUBSTRATE

(75) Inventors: Anton Blaakmeer, Le Venray (NL); Paul Jacques Louis Hubert Bouwens, Vl Vught (NL)

(73) Assignee: Rockwool International A/S, (DK)

( * ) Notice: Subject to any disclaimer, the term of this patent is extended or adjusted under 35 U.S.C. 154(b) by 0 days.

(21) Appl. No.: 09/762,778

(22) PCT Filed: Aug. 6, 1999

(86) PCT No.: PCT/EP99/05759

§ 371 (c)(1), (2), (4) Date: Apr. 20, 2001

(87) PCT Pub. No.: WO00/08919

PCT Pub. Date: Feb. 24, 2000

(30) Foreign Application Priority Data

Aug. 14, 1998 (EP) .................... 98202723

(51) Int. Cl.
*A01G 31/00* (2006.01)

(52) U.S. Cl. ..................... 47/59 S

(58) Field of Classification Search ............... 47/59 R, 47/59 S
See application file for complete search history.

(56) References Cited

U.S. PATENT DOCUMENTS

| 1,336,426 | A | * | 4/1920 | Fredericksen | 33/194 |
|---|---|---|---|---|---|
| 4,241,537 | A | * | 12/1980 | Wood | 47/77 |
| 4,559,074 | A | * | 12/1985 | Clarke | 71/24 |
| 4,927,455 | A | * | 5/1990 | Hotta et al. | 71/64.13 |
| 5,081,791 | A | * | 1/1992 | Baron et al. | 47/65.8 |
| 5,099,605 | A | * | 3/1992 | Moffet, Jr. | 47/59 R |
| 5,127,187 | A | * | 7/1992 | Hattori et al. | 47/59 R |
| 5,368,626 | A | * | 11/1994 | Schnuda | 71/23 |
| 5,836,107 | A | * | 11/1998 | Behrens | 47/56 |
| 6,074,988 | A | * | 6/2000 | King et al. | 504/187 |
| 6,183,531 | B1 | * | 2/2001 | De Groot et al. | 71/24 |
| 6,562,267 | B1 | * | 5/2003 | Hansen et al. | 264/109 |

FOREIGN PATENT DOCUMENTS

| DE | 4103597 | A | * | 10/1991 |
|---|---|---|---|---|
| EP | 0260106 | A |  | 3/1988 |
| GB | 1336426 |  | * | 11/1973 |
| GB | 2189478 | A |  | 10/1987 |
| SU | 1526612 | A | * | 12/1989 |
| WO | WO 9108662 | A |  | 6/1991 |
| WO | WO 9300797 | A |  | 1/1993 |
| WO | WO 9707664 | A |  | 3/1997 |
| WO | WO 9716961 | A |  | 5/1997 |

* cited by examiner

*Primary Examiner*—Son T. Nguyen
(74) *Attorney, Agent, or Firm*—The Webb Law Firm

(57) ABSTRACT

The invention relates to a mineral wool plant substrate comprising a coherent matrix of mineral wool and up to 20 volume % of an ion-exchange agent comprising a variable and/or fixed ion-exchange capacity of about 15, preferably 30 and most preferably 40 meq/100 g dry weight or more.

9 Claims, No Drawings

MINERAL WOOL PLANT SUBSTRATE

BACKGROUND OF THE INVENTION

1. Field of the Invention

The present invention relates to a mineral wool plant substrate, more in particular to a mineral wool plant substrate comprising a foreign material or materials in order to improve the properties of the mineral wool substrate to realize Crop Protection and/or improve plant performance in relation to additions (such as nutrients, pesticides, water and the like) as applied by growers during a cropping cycle.

2. Description of the Related Art

Mineral wool plant substrates for plant growth are well-known in the art and consist of a coherent matrix of mineral wool. This coherent matrix is formed by collecting a layer of mineral wool fibres provided with a curable binder, so that after curing the mineral wool fibres are substantially not displaceable relative to one another. If required for fast uptake of water this coherent matrix of mineral wool may be provided with a wetting agent.

Under mineral wool is to be understood glass wool, stone wool, rock wool, man made vitrous fibres, slag wool, and/or mixtures thereof.

The fibres may have an average diameter varying in between 1–10 μm. For rock wool the fibre diameter is on average about 4 μm.

The density of the coherent matrix of mineral wool may be between 10–200 $kg/m^3$, in general in the range of 40–80 $kg/m^3$.

Such a coherent matrix of mineral wool has a form retaining property, which is inherent due to the inorganic starting materials used. Furthermore, the water retaining capacity of these mineral wool plant substrates is very well controllable and predictable.

A problem is that growers, utilizing such mineral wool plant substrates may inadvertently stress and even damage plants by overdosing or underdosing the mineral wool substrates with additions, such as nutrient solutions, when considering plant requirements at a certain time and growth stage.

SUMMARY OF THE INVENTION

An object of the present invention is to provide an improved mineral wool plant substrate, which aims to overcome this problem.

According to a first aspect of the present invention there is provided a mineral wool plant substrate according to claim 1.

In soil, plants extract their necessary compounds such as essential nutrients from available compounds in the soil water. If the amount of compounds in the soil water either exceeds or is less than the amount required by the plant, these compounds will be respectively released or stored on charged soil particles. This can be quantified as the ion exchange capacity (IEC). These soil particles may contain both a fixed and/or a variable IEC (variable meaning that the amount of IEC is dependent on other parameters such as pH, water content and structure).

The mechanism of release and storage is based on the chemical equilibria of compounds between soil particles and the soil water solution and/or soil particles and soil air solution.

This IEC and the mechanism for release and storage of compounds in soils not only works for ions, but is also appropriate for compounds which are electrically neutral, but due to their chemical structure contain strong positive and negative dipole charges, examples being water and organic compounds such as carbon-acids and alcohols.

This mechanism for exchanging and storage of compounds and IEC is however lacking in mineral wool plant substrates. Therefore, if growers over or underdose mineral wool substrates with for example nutrients and pesticides, this can have a severe negative effect on the plants (such as stress, damage and the like) resulting in a suboptimal growth response, both qualitatively and quantitatively. The plant stress induced in this way, can even result in the induction of plant diseases.

The inventors have shown that by adding an ion exchange agent containing a fixed and/or variable IEC to mineral wool plant substrates, vital compounds are buffered therewithin. This means that if a grower adds an over or under dose of compounds to the plant substrate the plant is substantially prevented from negative effects thereby.

The ion-exchange agent is preferably a cation exchange-agent which comprises soil minerals, and most preferably exhibits a non-clay like behaviour with respect to swelling and shrinkage.

DESCRIPTION OF THE PREFERRED EMBODIMENTS

Micro-organisms can be very important to the growth of the plant. On the one hand such organisms play a role in plant protection, for example the occurrence plant diseases induced by pathogens and/or predators (such as phythium and Protozoa) are prohibited by both optimized crop conditions (such as sufficient nutrients) and the appearance of antagonists, i.e. micro-organisms, of these pathogens and predators, and on the other hand, micro-organisms (such as mycorizha) can live in symbioses with the plant and in this way induce improved plant growth.

A good habitat for micro-organisms is available in materials containing pores with an average size of 6 μm or less. Very good conditions are provided when the pores are smaller than 3 times the size of the micro-organisms, yet still larger than the organisms. Clay (such as Bentonite) is an example of a material containing an average pore size <6 μm. The porosity and average pore size of clay is not static but fluctuates considerably due to the swell and shrink behaviour of clay, which is influenced, amongst other things by the pH-level, EC-level and water content.

Plant pathogens and predators are bigger in size than known antagonist and plant beneficial micro-organisms. The latter are therefore more likely to profit from this smaller pore size.

In mineral wool plant substrates having a density of 10–200 $kg/m^3$ the average pore size is most likely to be larger than 10 μm. Mineral wool plant substrates have a stable structure and porosity and are substantially not sensitive to swell and shrink behaviour.

In order to improve the mineral wool plant substrate as a microbiological habitat, especially for plant protective micro-organisms, the ion-exchange agent preferably has an average pore size smaller than a mineral wool substrate of about 72 $kg/m^3$ (which has approximately an average pore size of 25 μm), preferably also exhibits less swelling and shrinkage than clay and most preferably has an average pore size <5 μm.

Most preferably the ion-exchange agent comprises a zeolite. Since zeolites have a stable, cage like structure they offer an ideal, stable habitat for micro-organisms.

The substrate may further more comprise an organic substance like peat, coco, sphagnum or several types of compost, preferably to a degree of humification of 10–70%, more preferably comprising 10–60% humic acids and/or nitrogen compounds (such as proteins, amino acids and amides) and most preferably originating from a natural source, which can substitute the mineral wool for upto 20 volume %, preferably upto 10 volume %.

Suitable organic substances are referred to in WO 96/33602 which are included herein by reference.

PH control in cropping is often required for a good growth response. However, with mineral wool plant substrates good pH control is difficult to achieve. The pH resulting from the nutrient solution (based on the required pH plant growth) often differs from the actual found pH in the mineral wool substrate. This is due to several reasons.

Firstly the mineral wool plant substrate behaves basic chemically, and therefore the pH in the substrate increases.

Secondly plants extrudate organic substances from their surroundings which can influence pH.

Uptake of nutritional ions leads to the exclusion of $H^+$ and $OH^-$ by plant roots which can also influence the pH. Furthermore the state of the plant conditions, i.e. considering factors such as induced stress can also influence the type and amount of nutrient uptake and exclusion of extrudates.

Organic substances are good at buffering $H^+$ ions via ad- and de-sorption of NH, groups and buffering of $OH^-$ ions via carbon-acid like groups (such as fulvic and Humic acids).

Organic matter is also susceptible to biological degradation, affecting structure, amount and function of the effective pH buffering groups and therefore the pH buffering capacity of the organic matter. The degree of humification of organic substances is an indication for the possible degree and amount of degradation. Substances with a low degree of humification are more likely to degrade than substances with a high degree humification. However, by using biologically degradable organic substances the mineral wool plant substrate provides further advantageous properties linked to the organic substance, being the provision of a carbon source. Further, due to the degradation of the organic substance plant stimulating compounds are released such as humic acids and vitamins which are beneficial to plant growth. Chelate forming compounds which keep slight or insoluble trace elements in the nutrient solution may also be released. The organic substance preferably has a degree of humification varying between 10–70% in order to provide good pH buffering and positive effects on degradation.

When it is desired to provide a mineral wool plant substrate with an improved water buffering capacity with higher available amounts of water between pF 0.5 and 2 and/or a more intermediate and fixed IEC, it is worthwhile to partially substitute the mineral wool by an inorganic substance such as a natural clay. The clay may substitute the mineral wool for up to 20 volume %.

Clay for substitution of the organic substance may comprise soil materials comprising hydrophilic particles preferably having a particle size below 20 µm, such particles, for example, belonging to the class of eroded minerals, such as clays, mixtures of clays with silt and sand having a clay fraction removable as sludge of at least 20%, and further bentonite, kaolin and the like. Particularly suitable are different naturally occurring types of clays or mixtures thereof, such as young sea clay. Examples are clays comprising 0–100%, preferably 10–50% of particles having a size preferably being smaller than 20 µm.

The use of clay provides another advantage when the organic substance is included in the matrix in the form of a pellet. In this situation clay functions as a lubricating agent and as a material that reduces the compressibility of the pellet.

The combination of clay and organic matter forms a so called clay-humus complex which can lead to an improved physical structure i.e. increased porosity, increased pore sizes and therefore a drier, more aerated structure.

Accordingly, the amount of clay may be used in order to change the biodegradable character of the organic substance used. For example peat which is normally biodegradable may rendered substantially bio-undegradable due to the addition of clay to the pellet.

In this manner, clay may inhibit or retard the biodegradation of the inorganic substance. The pellet may have a (particle) size of about 0.1–20 mm.

Due to the presence of clay and of peat the concentration of spore elements in the water residing within the mineral wool matrix may be controlled, due to the sustained release of cations temporarily stored within the organic substance and/or clay.

The invention will now be further elucidated by reference to the following examples.

EXAMPLE 1

A coherent growth substrate was prepared having the form of grow-blocks (10*10*6.5 cm) consisting of a coherent matrix of mineral wool to which a phenol-formaldehyde based binding agent and a wetting agent was applied. Prior to passage through a curing oven, zeolite in a quantity of 10 weight % (particle size 2–6 mm having a cation exchange Capacity of 80 meq/100 gram dry matter) was added to the matrix. The density of the coherent growth substrate amounted to 80 kg/m$^3$. The CEC of the coherent growth substrate based on volume contained a CEC of 3–6 mmol/liter substrate. This buffer capacity was 12–25% of the optimal applied nutrient solution.

EXAMPLE 2

A coherent growth substrate was prepared having the form of grow-blocks (10*10*6.5 cm) consisting of a coherent matrix of mineral wool to which a furan based binding agent was applied.

(Binding agents as described in WO 97/07664 are included herewith by reference)

Prior to passage through a curing oven, an equal mixture of 50' zeolite and 50' clay, which together formed a quantity of 10 weight % was added to the matrix. The density of the coherent growth substrate amounted to 80 kg/m$^3$.

The CEC of the Zeolite was 80 meq/100 gram dry matter, particle size was 2–6 mm, and the average pore size was <10 µm.

The CEC of the Clay was 20 meq/100 gram dry matter, particle size was 2–6 mm and the average pore size was 5–12 µm.

The average pore size of mineral wool matrix lay between 15–30 µm.

The CEC of the coherent growth substrate based on volume of the substrate contributed to a total CEC of 2–4 mmol/liter substrate. This buffer capacity was 8–16% of the optimal applied nutrient solution.

Based on the volume of the coherent substrate, less than 1% of the total volume of the substrate contained an average pore size of less than 12 µm.

The inventors have shown that was sufficient to establish two different ecological niches for micro-organisms of differing sizes compared to products without the addition of the ion exchange agent exhibiting only one ecological niche.

The added amount of clay contributed in an extra absolute amount of water of 1–2 volume % in pF range 0.5–1.5. The relative extra amount of water available in this pF range, increased from 2% for pF 0.5 to 14% for pF 1.3. Research indicated that the extra available amount of 1.5% in clay induced an improved growth response for cucumbers of 3–4% in the first 30 days of growth when applying a water regime lying between pF 1 and 1.3.

EXAMPLE 3

A coherent growth substrate was prepared having the form of grow-slabs (100*15*7.5 cm) which consisted of a coherent matrix of mineral wool to which a Phenol-Formaldehyde based binding agent and wetting agent were applied. Prior to passage through a curing oven, a mixture of 90% zeolite and 10% organic matter, together forming 12 weight % was added to the matrix. The density of the coherent growth substrate amounted to 57 kg/m$^3$.

The CEC of the Zeolite was 80 meq/100 gram dry matter, particle size was 2–6 mm and the average pore size was <10 μm.

The organic matter comprised more than 10% humic acid.

The average pore size of mineral wool matrix lay between 20–35 μm.

The CEC of the coherent growth substrate based on volume of the substrate contributed to a total CEC of 2–4.5 mmol/liter substrate. This buffer capacity was 8–16% of the optimal applied nutrient solution.

Based on the volume of the coherent substrate, less than 0.5% of the total volume of the substrate contained an average pore size of less than 10 μm. Research indicated that this is sufficient to establish two different ecological niches for micro-organisms of differing sizes compared to products without the addition of the ion exchange agent exhibiting only one ecological niche.

EXAMPLE 4

A coherent growth substrate was prepared having the form of growing blocks (10*10*6.5 cm) consisting of a coherent matrix to which a furan based binding agent was applied.

Prior to passage through a curing oven, Clinoptilolite, a natural Zeolite (commercially available from the American company 'Zeopro'), in a quantity of 5 weight %, (having a CEC (cation exchange capacity) of 85 meq/100 gram dry matter), was added to the matrix. The density of the coherent growth substrate amounted to 80 kg/m$^3$. The CEC of the coherent growth substrate based on volume contained a CEC of 4 mmol/liter substrate. This buffer capacity was 17–18% of the optimal applied nutrient solution.

The invention is not limited to the above description; the requested rights are rather determined by the following claims.

The invention claimed is:

1. A mineral wool plant substrate comprising a coherent matrix of mineral wool, a cured binder, and a quantity of an ion-exchange agent, wherein the ion-exchange agent comprises a zeolite comprising an ion-exchange capacity of at least about 15 meq/100 g dry weight, and wherein the zeolite ion-exchange agent is present in a maximum amount of 20 volume % and has a stable structure, exhibiting a non-clay like behavior with respect to swelling and shrinking, and further wherein the coherent matrix is formed by collecting a layer of mineral wool fibers that is cured by the binder, said cured binder fixing the fibers to one another so that they are substantially not displaceable relative to one another.

2. The substrate according to claim 1, wherein the zeolite ion-exchange agent has an average pore size of less than 25 μm.

3. The substrate according to claim 1, further comprising an organic substance selected from the group consisting of sphagnum and peat, wherein the organic substance substitutes the mineral wool for up to 20 volume %.

4. The substrate according to claim 1, further comprising clay, substituting the mineral wool for up to about 20 volume %.

5. The substrate according to claim 1, for use as a growing block.

6. A growing mat comprising the substrate of claim 1.

7. The substrate according to claim 1, wherein the ion-exchange agent has a stable zeolite, cage-like structure.

8. The substrate according to claim 1, wherein the zeolite ion-exchange agent has an ion-exchange capacity of about 30 meq/100 g dry weight.

9. The substrate according to claim 1, wherein the zeolite ion-exchange agent has an ion-exchange capacity of about 40 meq/100 g dry weight.

* * * * *

UNITED STATES PATENT AND TRADEMARK OFFICE
CERTIFICATE OF CORRECTION

| | | |
|---|---|---|
| PATENT NO. | : 7,104,006 B1 | Page 1 of 1 |
| APPLICATION NO. | : 09/762778 | |
| DATED | : September 12, 2006 | |
| INVENTOR(S) | : Blaakmeer et al. | |

It is certified that error appears in the above-identified patent and that said Letters Patent is hereby corrected as shown below:

<u>Title page</u> Item (75) Inventors:, Line 3, "V1 Vught (NL)" should read
-- VL Vught (NL) --

Signed and Sealed this

Twentieth Day of February, 2007

JON W. DUDAS
*Director of the United States Patent and Trademark Office*